US006529563B1

(12) United States Patent
Mosinskis et al.

(10) Patent No.: US 6,529,563 B1
(45) Date of Patent: Mar. 4, 2003

(54) METHOD AND APPARATUS FOR PROVIDING A SELF-SUSTAINING PRECISION VOLTAGE AND CURRENT FEEDBACK BIASING LOOP

(75) Inventors: Paulius M. Mosinskis, Richlandtown, PA (US); Amit Gattani, Tinton Falls, NJ (US); Paul James Hurst, Vacaville, CA (US); David William Cline, Sacramento, CA (US)

(73) Assignee: Level One Communications, Inc., Sacramento, CA (US)

( * ) Notice: Subject to any disclaimer, the term of this patent is extended or adjusted under 35 U.S.C. 154(b) by 0 days.

(21) Appl. No.: 09/378,853

(22) Filed: Aug. 23, 1999

(51) Int. Cl.[7] .......................... H04L 25/06; H04L 25/10

(52) U.S. Cl. ....................... 375/317; 327/530; 327/539; 327/540

(58) Field of Search ................................. 375/317, 287, 375/286, 319; 327/530, 539, 540, 64, 65, 66, 67; 341/115, 118; 330/127, 142

(56) References Cited

U.S. PATENT DOCUMENTS

| | | | | | |
|---|---|---|---|---|---|
| 3,855,555 | A | * | 12/1974 | Burkhard et al. | 332/11 D |
| 4,937,842 | A | | 6/1990 | Howell | 375/345 |
| 5,257,026 | A | | 10/1993 | Thompson et al. | 341/118 |
| 5,305,004 | A | | 4/1994 | Fattaruso | 341/120 |
| 5,517,148 | A | * | 5/1996 | Yin | 327/333 |
| 5,517,249 | A | | 5/1996 | Rodriquez-Cavazos et al. | 348/465 |
| 5,583,501 | A | | 12/1996 | Henrion et al. | 341/118 |
| 6,037,832 | A | * | 3/2000 | Kaminishi | 327/538 |
| 6,177,899 | B1 | * | 1/2001 | Hsu | 341/156 |
| 6,414,517 | B1 | * | 7/2002 | Kim et al. | 326/88 |
| 6,441,594 | B1 | * | 8/2002 | Connell et al. | 323/274 |

OTHER PUBLICATIONS

"An Overview of Basic Concepts", J.C. Candy; *Delta–Sigma Data Converters Theory, Design, and Simulation*; Ch. 1, pp. 1–13.

"Linearity Enhancement of Multibit ΔΣA/D and D/A Converters Using Data Weighted Averaging"; *IEEE Transactions on Circuits and Systems–II: Analog and Digital Signal Processing*, vol. 42, No. 12, Dec. 1995; pp. 753–762.

"A High Resolution Multibit Sigma–Delta Modulator with Individual Level Averaging"; *IEEE Journal of Solid–State Circuits*, vol. 30, No. 4, Apr. 1995; pp. 453–460.

"Digitally Corrected Mult–Bit ΔΣData Converters"; T. Cataltepe et al.; Electrical Engineering Department, UCLA; 1989; pp. 647–650.

* cited by examiner

*Primary Examiner*—Mohammad H. Ghayour
(74) *Attorney, Agent, or Firm*—Altera Law Group, LLC

(57) ABSTRACT

A method and apparatus for providing a self-sustaining precise voltage and current feedback biasing loop. The present invention provides a circuit for initially biasing the bandgap and master bias current generator at startup. The feedback biasing loop has loop dynamics that are chosen such that the gain of the positive feedback loop is less than one so that the loop will not oscillate under normal operation after power-up.

7 Claims, 4 Drawing Sheets

METHOD AND APPARATUS FOR PROVIDING A SELF-SUSTAINING PRECISION VOLTAGE AND CURRENT FEEDBACK BIASING LOOP

BACKGROUND OF THE INVENTION

1. Field of the Invention

This invention relates in general to telecommunications, and more particularly to a method and apparatus for providing a self-sustaining precision voltage and current feedback biasing loop.

2. Description of Related Art

Global communications continues to demonstrate rapid growth rates. As more people become accustomed to the convenience of electronic mail, web-based facsimile transmission, electronic commerce, telecommuting and high-speed Internet access, the demand on the telecommunications industry to provide adequate bandwidth to provide this type of service also increases. The growth in the number of people using electronic communications will only increase as the price of Internet access and Internet access devices such as personal digital assistants (PDAs), computers, etc.

Today, copper telephone lines service almost all voice traffic and most of the Internet traffic. However, as content rich applications continue to grow, both public and private copper access networks are being challenged. The local portion of the enterprise becomes a major challenge for access providers. To take advantage of the increasingly popular innovations in telecommunications technology, additional telephone lines are being installed in private residences and businesses.

Although analog modems have managed to stretch their potential speed to 56 kilobits per second (kbps), small-office/home-office (SOHO) customers need far greater Internet bandwidth to accommodate multimedia applications ranging form three-dimensional web sites to video conferencing. Analog modems cannot deliver the necessary bandwidth and, therefore, have reached the end of their usefulness.

In response to these developments, communications companies are responding with a variety of digital access solutions, all variants of Digital Subscriber Line (DSL) technology. These DSL technologies differ dramatically in their abilities to address major SOHO applications and the requirements of telephone companies.

DSL technologies are transport mechanisms for delivering high-bandwidth digital data services via twisted-pair copper wires. These copper wires provide the cabling between the telephone company's central offices and subscribers. DSL technology is a copper loop transmission technology that solves the bottleneck problem often associated with the last mile between Network Service Providers and the users of those network services. DSL technology achieves broadband speeds over ordinary phone wire. While DSL technology offers dramatic speed improvements (up to 7+ Mbps) compared to other network access methods, the real strength of DSL-based services lies in the opportunities driven by multimedia applications required by today's network users, performance and reliability and economics.

Without such transport mechanisms, subscribers would have to rely on T1 (1.5 Mbps) or E1 (2.0 Mbps) service, which requires the phone company to install expensive new cabling to every location that wants high-speed digital service. The installation costs make T1/E1 service expensive.

The original DSL service was ISDN DSL (ISDL), which was defined in the late 1980s. ISDL provides 160 kbps rates over a single twisted-pair at ranges up to 18,000 feet from the telephone company's central office. While this service has been deployed to may homes and small businesses all over the world, the demands of multimedia applications are already challenging IDSL's bandwidth.

Asymmetric Digital Service Line (ADSL) is currently being embraced by residential web surfers for its ability to quickly download music and video files. ADSL refers to modem technology that transforms twisted copper pair (ordinary phone lines) into a pipeline for ultra fast Internet access. As the name suggests, ADSL is not asynchronous transmission, but rather asymmetric digital transmission, i.e., ADSL transmits more than 6 Mbps (optionally up to 8 Mbps) to a subscriber, and as much as 640 kbps (optionally up to 1 Mbps) in the other direction.

ADSL has the ability to increase normal phone line capacity by 99% via a digital coding technique. This extra capacity means that one could simultaneously assess the World Wide Web and use the telephone or send a fax. A user of this technology could have uninterrupted Internet access that is always on-line. This technology also has the potential to be a cost-effective solution for residential customers, telecommuters and small business.

Still, there is a need for symmetric high-speed connection. For example, small businesses have become increasingly dependent on sophisticated voice and data products and services for competing against larger corporations. Until now, the cost of providing small businesses with professional telephony and data services was prohibitive. However, integrated access and virtual public branch exchanges (PBXs) are providing small businesses with voice mail, high-speed Internet access, multiple business lines and sufficient capabilities for telecommuters.

As mentioned above, symmetric services were traditionally delivered by T1 and E1 lines. Within the DSL family, HDSL has long been used to provision T1 lines because its long reach requires regeneration-signal boosting-only every 12,000 feet, compared with every 4,000 feet for other T1 provisioning techniques. In fact, HDSL's ability to simplify and cheapen T1 deployment has made HDSL by far the most established of the DSL technology family.

As an inexpensive and flexible replacement for leased T1 lines, the HDSL2 standards are eagerly awaited by the DSL industry. HDSL2 replaces the aging HDSL standard that required two copper pairs. HDSL2 uses only one copper pair and is potentially rate adjustable. HDSL2 , which is being developed within the framework of the American National Standards Institute (ANSI, New York), promises to make HDSL more compelling in two ways. While HDSL was a proprietary technique-modems at the central office (CO) and the customer premises had to come from the same vendor-HDSL2 will be an interoperable standard in which modems can be mixed. Perhaps the biggest selling point of HDSL 2, however, is that it can use one pair of copper wires instead of HDSL's two. Network service providers thus have a choice. HDSL and one-pair HDSL2 have about the same reach, while two-pair HDSL2 adds as much as another 4,000 feet of reach, depending on the gauge of copper and other conditions. Hoping to propel the new DSL technology into the business arena, eight chip makers and OEMs have formed a consortium for the HDSL2 standard.

An HDSL2 transceiver includes a framer, a data pump and an analog interface for coupling to the twisted-pair line. In the transmit function, the framer accepts a digital signal and outputs to the data pump a serial digital signal that includes the data payload plus an HDSL2 overhead. In the receive function, the framer receives HDSL frames from the data pump.

The data pump includes a transceiver and an analog front end that receives the HDSL frames serially from the framer. The transceiver converts the HDSL frames into a transmit signal by first converting the HDSL frames into symbols. Typically, a modulator, such as a trellis code modulator (TCM) encodes the symbols into a pulse amplitude modulation (PAM) signal. The signal is further processed to condition and filter the PAM signal. The analog front end provides pulse shaping to analog signals. This process is reversed in the receive channel with echo cancellation provided to cancel most of the echoed transmit signal.

As mentioned, the analog front end includes a transmit and a receive channel. In the transmit channel, the analog front end receives a pulse width modulated digital data stream from the transceiver. The parallel digital data is converted to a serial analog signal via a parallel-to-serial/digital-to-analog D/A converter. A switched-capacitor circuit filter shapes the analog signal to meet specific spectral templates. The receive channel consists of an automatic gain control (AGC) stage and an analog-to-digital (A/D) converter. The AGC stage sets the amplitude to the optimum level to prevent saturation of the A/D converter.

Implementation of high precision and low noise A/D convertors and D/A convertors requires the associated voltage and current references be very accurate and low noise in nature. Accuracy of voltage reference is required to accurately transmit the desired power to the line, independent of process, voltage and temperature conditions. Since the voltage reference is used by both the A-to-D and D-to-A convertors, the reference is also required to be very low noise in nature otherwise it degrades the Signal-to-Noise ratio of the signal processing paths. Based on these requirements, the voltage reference is often implemented in the form of a bandgap reference.

The current reference is also desired to be very accurate over process, voltage and temperature conditions. Wide current tolerances, e.g., ±25%, will require all the operational amplifiers to meet performance specifications over the worst case current tolerance, which would lead to more power consumption and overdesign. Excessive noise on the current reference can also show up in the output spectrum of received and transmit signals. Hence the current reference is also desired to be very accurate, e.g., ±5%, with very low noise on it. The current reference is implemented using the available accurate and low noise bandgap voltage and applying it to an external low tolerance resistor. Based on accurate voltage and resistor, the derived current is accurate. This current is filtered and then mirrored for use in all the other blocks. This reference current generator is referred to as Master Bias Current Generator (MBCG).

In such a scheme as described above, the bandgap reference voltage generator also requires a reference bias current for its own operation. This reference can be locally generated or can come from the master bias current generator (MCBG) on the chip. The local current will have wide tolerance over process, temperature and voltage, e.g., ±,35–50%, and will not be low noise. To provide a low noise local current requires excessive filtering. Thus, the bandgap circuit must work properly under large variations of current, leading to more typical power consumption which is undesirable. On the other hand, if the current from master bias current generator is used, then the bandgap circuit will get a very accurate and low noise current. This current is low in noise for two reasons: it uses bandgap reference for a reference voltage, which itself is required to be low noise, and secondly, substantial filtering is provided in current mirrors since the A-to-D and D-to-A require low noise currents. Hence it is desirable to use the current bias for the bandgap circuit also.

This presents a problem because a current from MCBC is used to bias the bandgap, and the voltage from bandgap is used to bias and generate current in the MCBG. This creates a positive feedback loop which is feeding on to itself. This loop can have both start-up and sustained operation problems in form of oscillations.

It can be seen then that there is a need for initiating such a loop at the time of power-up.

It can also be seen then that there is a need for a method and apparatus for providing a self-sustaining precision voltage and current feedback biasing loop.

It can also be seen then that there is a need for a feedback biasing loop having loop dynamics that are chosen such that the gain of the positive feedback loop is less than one so that the loop will not oscillate under normal operation after power-up.

SUMMARY OF THE INVENTION

To overcome the limitations in the prior art described above, and to overcome other limitations that will become apparent upon reading and understanding the present specification, the present invention discloses a method and apparatus for providing a self-sustaining precise voltage and current feedback biasing loop.

The present invention solves the above-described problems by providing a circuit for initially biasing the bandgap and master bias current generator at startup.

A method in accordance with the principles of the present invention includes determining whether a generated voltage satisfies a threshold condition, establishing a first reference voltage for generating a bias current when the generated voltage does not satisfy the threshold condition and establishing a second reference voltage for generating the bias current when the generated voltage satisfies the threshold condition, wherein the bias current is used to create the generated voltage.

Other embodiments of a method in accordance with the principles of the invention may include alternative or optional additional aspects. One such aspect of the present invention is that the determining whether a generated voltage satisfies a threshold condition further comprises comparing the generated voltage to a predetermined comparison voltage.

Another aspect of the present invention is that the establishing the first reference voltage includes generating a control voltage when the generated voltage is less than the predetermined comparison voltage and using the control voltage to turn off a first device for establishing a second reference voltage and to turn on a second device, the turning on of the second device creating the first reference voltage.

Another aspect of the present invention is that the establishing the second reference voltage includes driving a first device with the generated voltage to turn on the first device and creating the second reference voltage in response to turning on the first device.

Another aspect of the present invention is that the generating the bias current further includes processing the first or second reference voltage to produce a current control voltage, driving a third device with the current control voltage to create a first current, and mirroring the first current to produce the bias current.

The present invention may be embodied in a feedback biasing loop for providing highly accurate and low noise voltage and current signals to components, such as analog-to-digital and digital-to-analog converters. Such a feedback biasing loop includes a bandgap reference voltage generator for generating a bandgap voltage output, a master bias current generator, coupled to the bandgap reference voltage generator, for generating a bias current in response to the bandgap voltage output, the bias current being provided to the bandgap reference voltage generator by a current feedback loop for controlling the generation of the bandgap voltage output and an initialization device, coupled to the bandgap reference voltage generator, for ensuring proper start-up of the current feedback loop. The feedback biasing loop may also be implemented in an analog front end of an HDSL2 system.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing a self-sustaining precise voltage and current feedback biasing loop. The present invention provides a circuit for initially biasing the bandgap and master bias current generator at startup.

Figure 1:
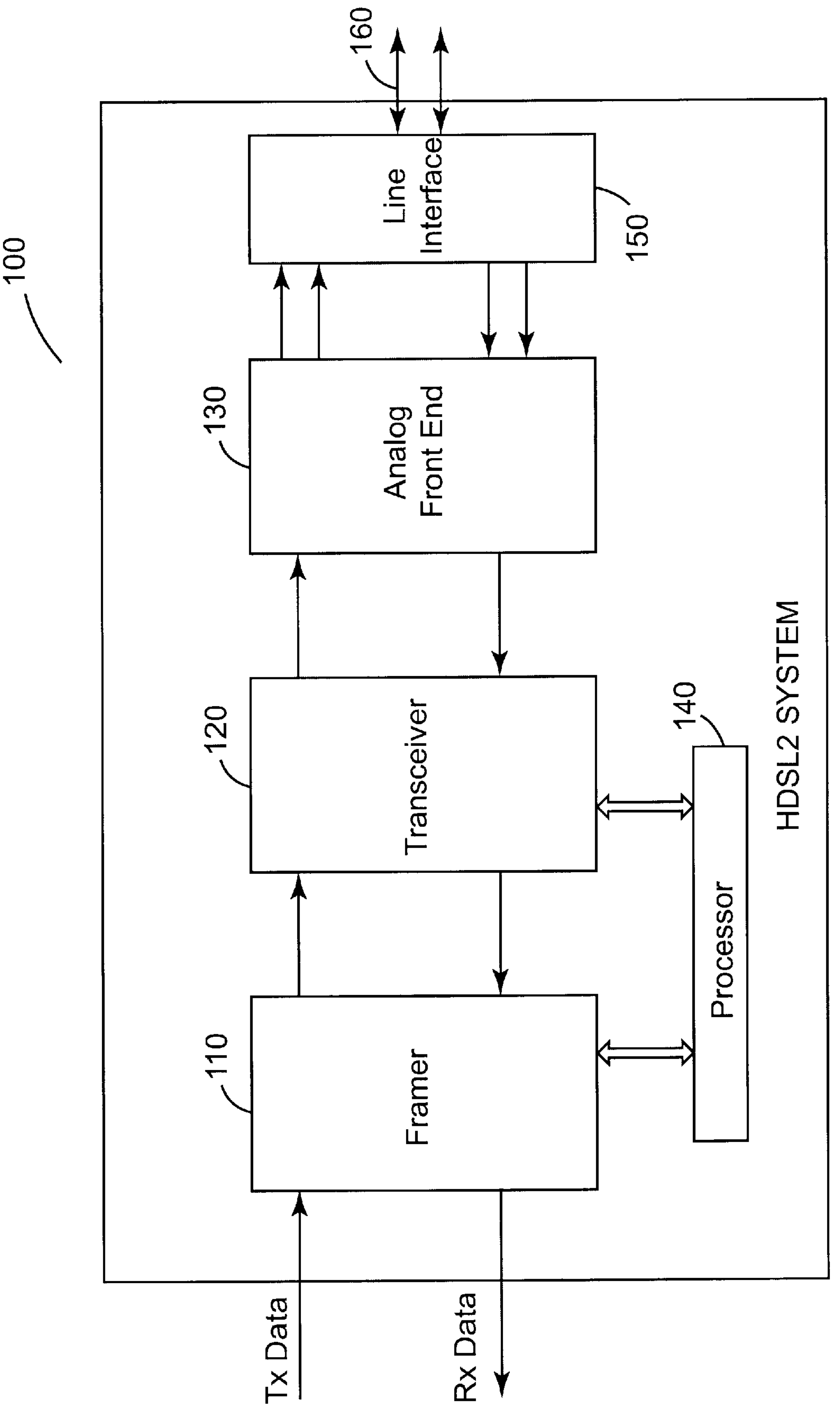
FIG. 1 illustrates a block diagram of an HDSL2 system according to the present invention.

FIG. 1 illustrates a block diagram of an HDSL2 system 100 according to the present invention. In FIG. 1, the system includes a framer 110, a transceiver 120 and an analog front end 130. The framer 110 provides frame mapping for embedding T1/E1 digital signals (DS1 payloads) into HDSL2 frames. The framer 110 also adds forward error correction codes to the HDSL2 frames to overcome local loop impairments and to provide increased noise margins. The transceiver 120 provides timing recovery, adaptive equalization, echo cancellation and modulation, e.g., pulse amplitude modulation. The analog front end 130 receives a pulse width modulated data stream in the form of four bit digital signals and converts the digital signals to an analog output after providing pulse shaping to shape the analog output signal to meet predetermined spectral templates. A processor 140 controls the framer 110 and the transceiver 120. A line interface 150 couples the analog front end 130 to the twisted-pair line 160.

Figure 2:
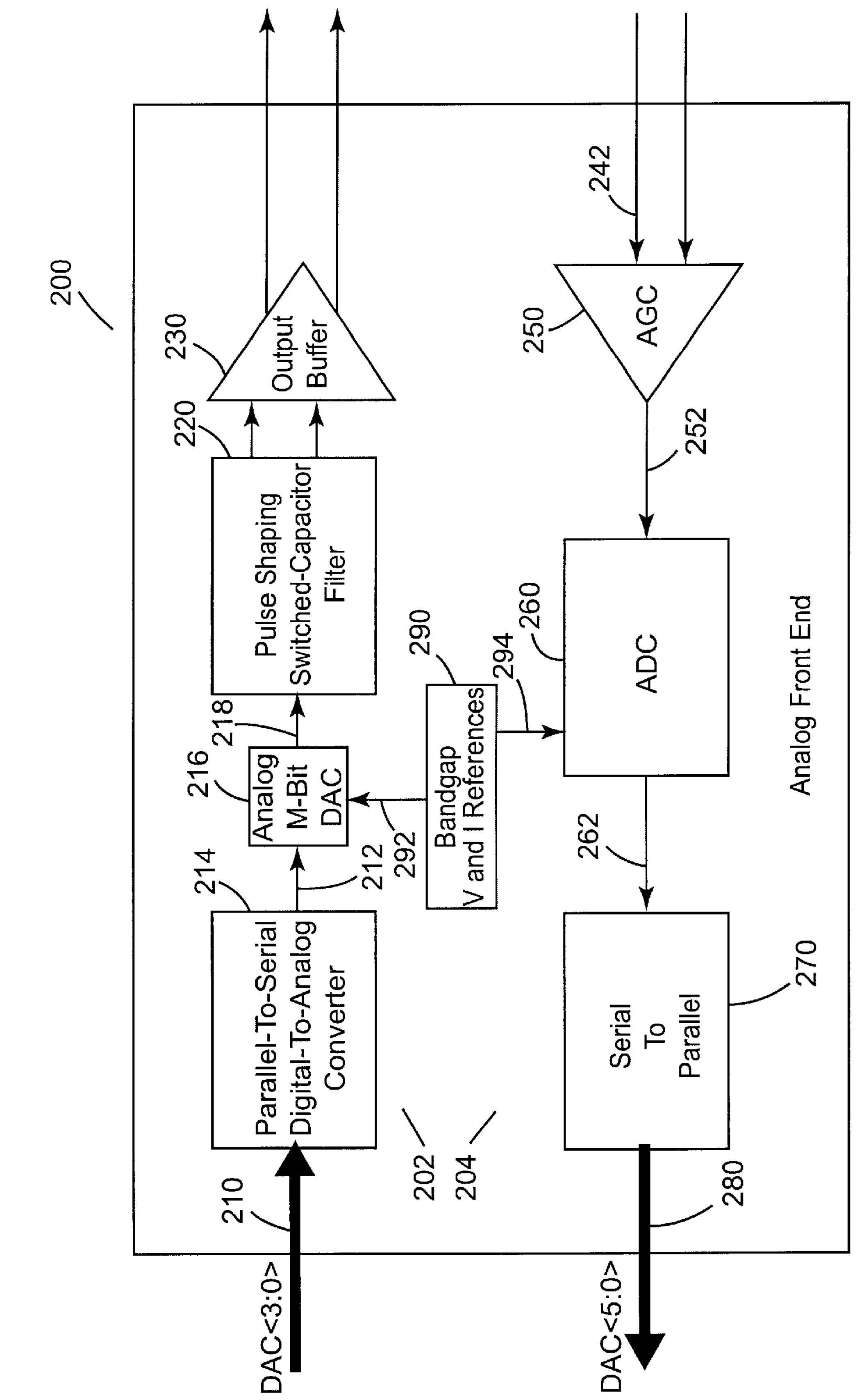
FIG. 2 illustrates a block diagram of the analog front end according to the present invention.

FIG. 2 illustrates a block diagram of the analog front end 200 according to the present invention. In the transmit channel 202, the four bit, parallel pulse width modulated data stream 210 is received and converted to a serial signal 212 by the parallel-to-serial converter 214. The serial signal 212 is received by an analog m-bit digital-to-analog converter 216 for converting the serial digital signal 212 to an analog signal 218. The analog signal 218 is shaped by the switched-capacitor filter 220. An output buffer 230 provides a unity gain, high input impedance, and low distortion, as well as the capability to drive low output impedance.

In the receive channel 204 of the analog front end 200, the analog signals 242 are received and processed by an automatic gain control (AGC) circuit 250. The output 252 from the AGC 250 is provided by an analog-to-digital (A/D) converter 260, e.g. a delta-sigma A/D converter. A serial-to-parallel converter 270 takes the digital signal from the A/D 260 and provides a six bit, parallel signal 280 back to the transceiver (not shown). Both the A/D convertor and the D/A convertor required high precision and low noise voltage and current references.

A bandgap voltage and current reference 290 is provided to supply the high precision and low noise A/D and D/A convertors their associated voltage and current references 292, 294. Accuracy of voltage reference is required to accurately transmit the desired power to the line, independent of process, voltage and temperature conditions. Since the voltage reference is used by both the A/D and D/A convertors, the reference is also required to be very low noise in nature otherwise it degrades the Signal-to-Noise ratio of the signal processing paths. Based on these requirements, the voltage reference is often implemented in the form of a bandgap reference. The current reference is also desired to be very accurate over process, voltage and temperature conditions. Wide current tolerances, e.g., ±25%, will require all the operational amplifiers to meet performance specifications over the worst case current tolerance, which would lead to more power consumption and overdesign. Excessive noise on the current reference can also show up in the output spectrum of received and transmit signals. Hence the current reference is also desired to be very accurate, e.g., ±5%, with very low noise on it.

Figure 3:
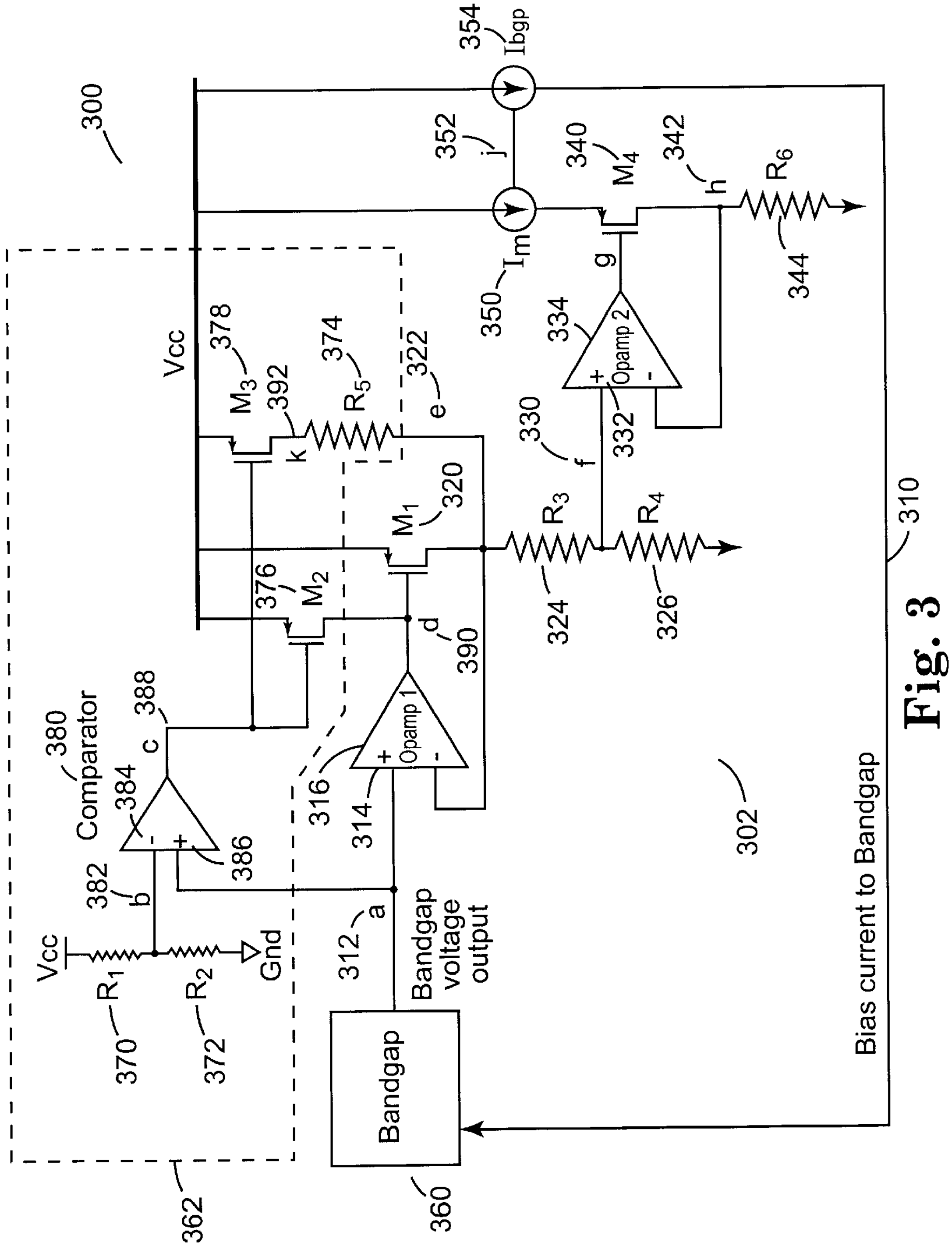
FIG. 3 illustrates a detailed block diagram of the master bias current generator (MBCG) according to the present invention.

FIG. 3 illustrates a detailed block diagram 300 of the master bias current generator (MBCG) according to the present invention. Without the feedback loop 310 between bandgap 360 and MCBG 302, the operation of the circuit 300 will operate as described herein. The bandgap reference voltage is applied on node a 312 of the circuit 300, which is the positive input 314 of Opamp1 316. Opamp1 316 is configured in a unity gain negative feedback loop with PMOS transistor $M_1$ 320. Hence the voltage at node e 322 is the same as the voltage at node a 312 ($V_e=V_a=V_{bandgap}$). Resistors $R_3$ 324 and $R_4$ 326 form a resistor divider which is used to create voltage $V_f$ at node f 330 by the ratio of $R_3$ 324 and $R_4$ 326 ($V_f=V_e*R_4/(R_3+R_4)$). $V_f$ is applied to the positive terminal 332 of Opamp2 334. Opamp2 334 again forms a unity gain negative feedback loop with PMOS transistor $M_4$ 340. Hence voltage at node h 342 ($V_h$) is the same as the voltage at node f 330. Resistor $R_6$ 344 is an external low tolerance accurate resistor.

Hence the current flowing through resistor $R_6$ 344 is given by:

$$I_m=V_h/R_6=V_f/R_6=(V_{bandgap}/R_6)*(R_4/(R_3+R_4)).$$

Here $V_{bandgap}$ at node a 312 and $R_6$ 344 are chosen to be accurate. The $R_4/(R_3+R_4)$ factor is ratio of on-chip resistors, which can be made accurate by good matching. Hence the reference current $I_m$ 350 can be made accurate, which is the goal. Before distributing this current 350 to all the other blocks, $I_m$ 350 can be filtered to desirable level to remove and reduce noise at desired frequencies.

Node j 352 is shown as the current mirror bias mode, which mirrors $I_m$ 350 to $I_{bgp}$ 354, which is then used in the Bandgap 360, and hence completes the feedback loop 310 as described before.

At the time of power-up, the bandgap voltage at node a 312 will be close to ground voltage. This will reflect as an indeterministic voltage at node h 342 since none of the active circuits will work at that time. This will lead to indeterministic or no current in $I_m$ branch 350, and hence in $I_{bgp}$ branch 354. If the Bandgap 360 will not get any bias current, it will not start-up, leading to failure of this whole loop to start-up.

Accordingly, an initialization circuit 362 is provided to ensure proper start-up of the feedback loop 312. The initialization circuit 362 includes resistors $R_1$ 370, $R_2$ 372, $R_5$ 374, PMOS transistors $M_2$ 376 and $M_3$ 378, and comparator 380. The ratio of resistors $R_1$ 370 and $R_2$ 372 sets the voltage at node b 382, the negative input 384 of the comparator 380. The positive input 386 of the comparator 380 is connected to bandgap output voltage at node a 312. At power-up, when the Bandgap has not started, $V_a<V_b$, and hence the comparator 380 output 388, $V_c$, is equal to 0. Hence $V_c$ at node c 388, which is connected to gates of $M_2$ 376 and $M_3$ 378 turns both these gates 376, 378 on. Turning on of PMOS $M_2$ 376 leads to pulling-up of node d 390 to $V_{cc}$ level, in turn turning gate $M_1$ 320 off and leaving node e 322 undriven from $M_1$ path 320. Turning on of $M_3$ 378 pulls node k 392 up to $V_{cc}$ level, in turn providing current path from $V_{cc}$ to ground through $R_5$ 374, $R_3$ 324 and $R_4$ 326. Hence the ratio of these resistors sets the voltage at nodes e 322 and f 330. These ratios are chosen such that $V_e$ is close to $V_{bandgap}$ at the time of start-up, just like it will be in the desired stable operating mode. This $V_e$ is $V_{cc}$ dependent and is not as clean and accurate as $V_{bandgap}$, but is good enough for start-up. Once proper start-up voltages at nodes e 322 and f 330 are established, the rest of the circuit starts normally leading to the desired current levels in $I_m$ 350 and $I_{bgp}$ 354.

Once current is established current mirror $I_{bgp}$ 354, the Bandgap 360 gets desired current and starts to produce a voltage at node a 312 approaching the desired operating point. As node a 312 ramps up from close to ground to desired $V_{bandgap}$, the comparator 380 will change its state. Voltage at node b 382 is chosen to be roughly 75% of desired $V_{bandgap}$. Hence when $V_a$>75% of $V_{bandgap}$, then the comparator 380 trips, pulling node c 388 high. When node c 388 goes high, PMOS transistors $M_2$ 376 and $M_3$ 378 are turned off. This turns off current path from $M_3$ 378 and $R_5$ 374 to node e 322. Since Opamp1 316 is now getting input $V_a$ in its proper operating range, Opamp1 316 starts to work and drives gate of $M_1$ 320 to establish $V_e=V_a$, i.e. $V_e$ will start to follow $V_a$. At this time the voltage at node a 312 is still below desired $V_{bandgap}$, and hence the currents in $R_6$ 344, $I_m$ 350 and $I_{bgp}$ 354 will go down temporarily (brief transient glitch). However the effect of this reduction in current is not sufficient to effect the normal ramp-up of the bandgap (the gain from current input to bandgap operating point is chosen to be very low), and hence over short period of time the bandgap output reaches desired voltage $V_{bandgap}$. This reflects in desired current levels to get established in current mirror $I_m$ 350 and $I_{bgp}$ 354, and all the other current distributors which are available to go across the chip. Once the loop 310 is established, it operates normally without any oscillations by choosing a loop gain of less than one.

Figure 4:
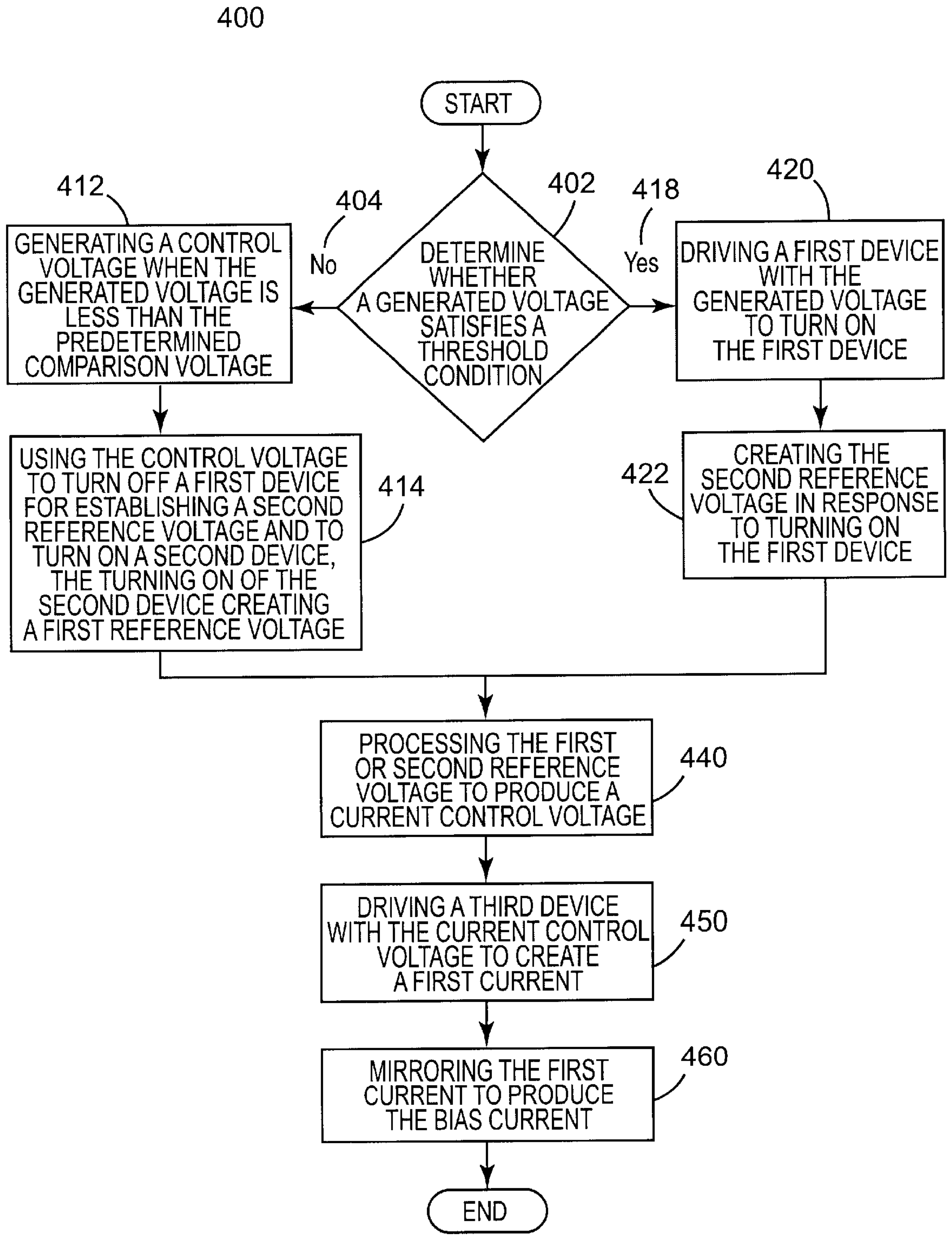
FIG. 4 illustrates a flow chart of a method for providing a self-sustaining precision voltage and current feedback biasing loop.

FIG. 4 illustrates a flow chart 400 of a method for providing a self-sustaining precision voltage and current feedback biasing loop. In FIG. 4, a determination is made as to whether a generated bandgap voltage satisfies a threshold condition 402. If the threshold condition is not satisfied 404, a control voltage is generated 412. Then, the control voltage is used to turn off a first device for establishing a second reference voltage and to turn on a second device, the turning on of the second device creating the first reference voltage 414. If the threshold condition is met 418, a first device is driven with the generated voltage to turn it on 420. The second reference voltage is then created in response to turning on the first device 422. The first or second reference voltage is processed to produce a current control voltage 440. A third device is driven with the current control voltage to create a first current 450. Then, the first current is mirrored to produce the bias current 460. The bias current may then be fed back to the Bandgap for generating the bandgap voltage.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a self-sustaining precision voltage and current feedback biasing loop, comprising:

determining whether a generated voltage satisfies a threshold condition;

establishing a first reference voltage for generating a bias current when the generated voltage does not satisfy the threshold condition; and establishing a second reference voltage for generating the bias current when the generated voltage satisfies the threshold condition, wherein the bias current is used to create the generated voltage.

2. The method of claim 1 wherein the determining whether a generated voltage satisfies a threshold condition further comprises comparing the generated voltage to a predetermined comparison voltage.

3. The method of claim 2 wherein the establishing the first reference voltage comprises:

generating a control voltage when the generated voltage is less than the predetermined comparison voltage; and using the control voltage to turn off a first device for establishing a second reference voltage and to turn on a second device, the turning on of the second device creating the first reference voltage.

4. The method of claim 2 wherein the establishing the second reference voltage comprises:

driving a first device with the generated voltage to turn on the first device; and creating the second reference voltage in response to turning on the first device.

5. The method of claim 2 wherein the generating the bias current further comprises:

processing the first or second reference voltage to produce a current control voltage;

driving a third device with the current control voltage to create a first current; and mirroring the first current to produce the bias current.

6. An analog front end system for a communications system, comprising:

(I) a receive channel for receiving analog signals and processing the analog signals to produce digital output signals; and (II) a transmit channel for processing received digital signals, the transmit channel comprising:

(A) a digital-to-analog convertor for converting the received digital signals to analog signals;

(B) a switched-capacitor stage for providing a shaped differential output signal in response to the analog signals;

(C) a buffer amplifier stage for transferring the shaped differential output signal to a low output impedance via buffer amplifier stage differential output signals; and (D) a self-sustaining precision voltage and current feedback biasing loop for providing voltage and current bias signals to at least the analog-to-digital convertor, the biasing loop further comprising:

(i) a bandgap reference voltage generator for generating a bandgap voltage output;

(ii) a master bias current generator, coupled to the bandgap reference voltage generator, for generating a bias current in response to the bandgap voltage output, the bias current being provided to the bandgap reference voltage generator by a current feedback loop for controlling the generation of the bandgap voltage output; and (iii) an initialization device, coupled to the bandgap reference voltage generator, for ensuring proper start-up of the current feedback loop.

7. An HDSL2 (High-bit-rate Digital Subscriber Line version 2) system, comprising:

(I) a framer for providing frame mapping of T1/E1 digital signals into HDSL2 frames;

(II) a transceiver, coupled to the framer, for processing HDSL2 frames into digital signals for transmission; and (III) an analog front end, coupled to the transceiver, for converting the digital signals into analog signals and shaping a spectral content of the analog signals, wherein the analog front end further comprises:

(A) a receive channel for receiving analog signals and processing the analog signals to produce digital output signals; and (B) a transmit channel for processing received digital signals, the transmit comprising:

(i) a digital-to-analog convertor for converting the received digital signals to analog signals;

(ii) a switched-capacitor stage for providing a shaped differential output signal in response to the analog signals;

(iii) a buffer amplifier stage for transferring the shaped differential signal to a low output impedance via buffer amplifier stage differential output signals; and (iv) a self-sustaining precision voltage and current feedback biasing loop for providing voltage and current bias signals to at least the analog-to-digital convertor, the biasing loop further comprising:

(a) a bandgap reference voltage generator for generating a bandgap voltage output;

(b) a master bias current generator, coupled to the bandgap reference voltage generator, for generating a bias current in response to the bandgap voltage output, the bias current being provided to the bandgap reference voltage generator by a current feedback loop for controlling the generation of the bandgap voltage output; and (c) an initialization device, coupled to the bandgap reference voltage generator, for ensuring proper start-up of the current feedback loop.

* * * * *